682
United States Patent [19]
Smith

[11] Patent Number: 4,760,232
[45] Date of Patent: Jul. 26, 1988

[54] METHOD OF CLADDING A STEEL CYLINDRICAL CORE

[75] Inventor: Ken M. Smith, Pointe Claire, Canada

[73] Assignee: Mec-Fab Inc., Boucherville, Canada

[21] Appl. No.: 95,919

[22] Filed: Sep. 14, 1987

[30] Foreign Application Priority Data

Oct. 21, 1986 [CA] Canada ................................. 521049

[51] Int. Cl.$^4$ ........................................... B23K 9/225
[52] U.S. Cl. ................................... 219/61; 219/76.1; 29/148.4 D; 228/129
[58] Field of Search ..................... 219/61, 76.1, 76.12, 219/76.14, 76.15; 29/447, 148.4 D; 228/129

[56] References Cited

U.S. PATENT DOCUMENTS

| | | | |
|---|---|---|---|
| 1,690,684 | 11/1928 | Johnson | 228/129 X |
| 1,963,745 | 6/1934 | Ingersoll et al. | 228/129 |
| 2,111,791 | 3/1938 | Larson | 219/76.1 |
| 2,821,010 | 1/1958 | Vasconi et al. | 29/447 |
| 3,526,939 | 9/1970 | Nikkanen | 29/148.4 D |
| 3,739,443 | 6/1973 | Friedman | 29/447 X |

Primary Examiner—E. A. Goldberg
Assistant Examiner—C. M. Sigda
Attorney, Agent, or Firm—William H. James; Neil W. McDermid

[57] ABSTRACT

A method of cladding a steel roll, such as a felt roll with a non-corrosive shell, ensures that the shell is tightly fitted to the core and is free to expand and contract on the core to avoid distortion problems. The method comprises the steps of preparing two stainless steel shells each having a length equivalent to the circumference of the core plus a predetermined extra, wrapping the shells about the core, side by side, leaving a predetermined circumferential gap between the shells, heating and clamping the shells tightly around the core until the longitudinal joints each attain a predetermined longitudinal gap, welding the longitudinal gaps, and circumferential gap between the shells while the shells are hot, ensuring the sheets are welded together and not welded to the core.

11 Claims, 2 Drawing Sheets

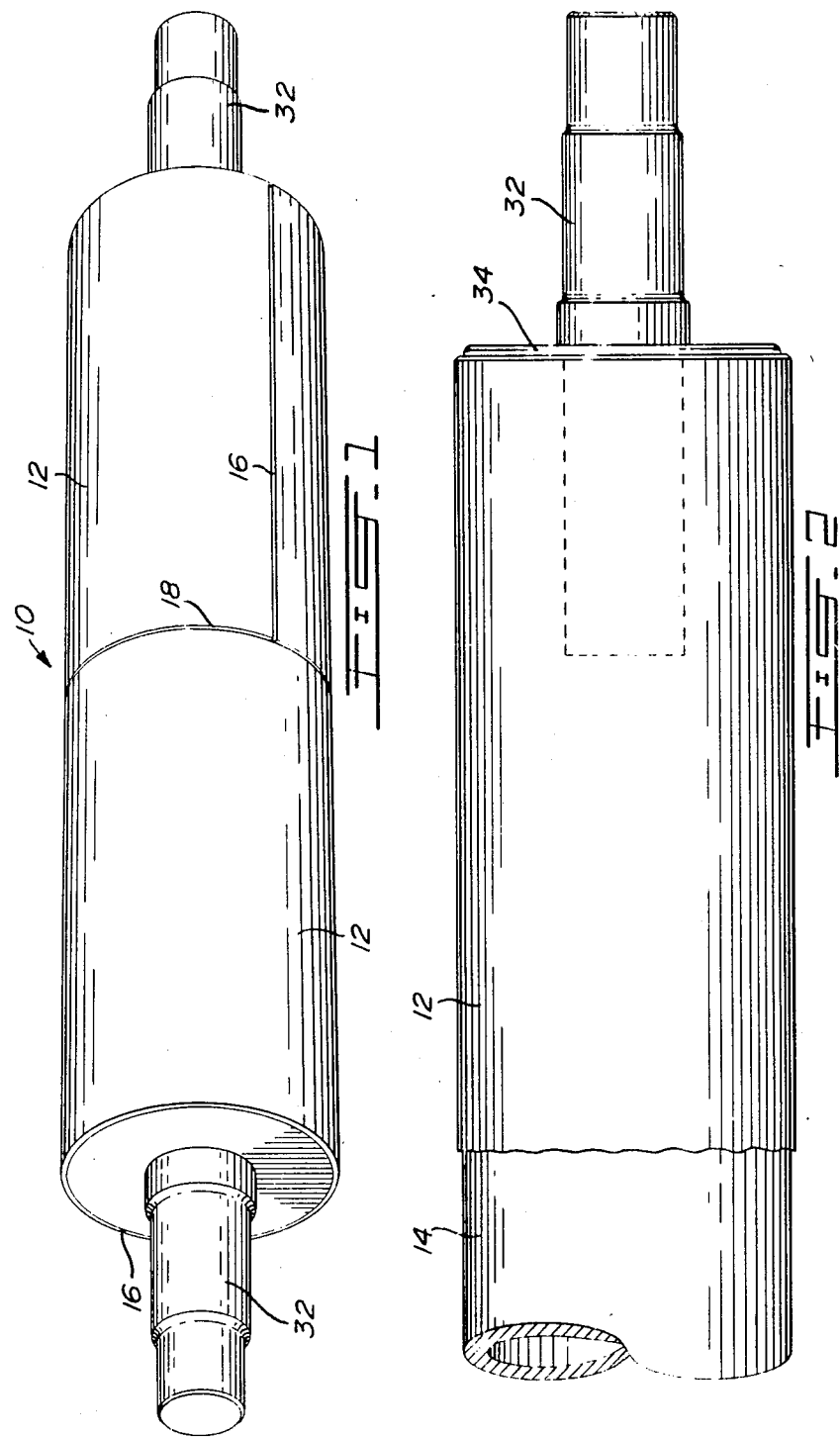

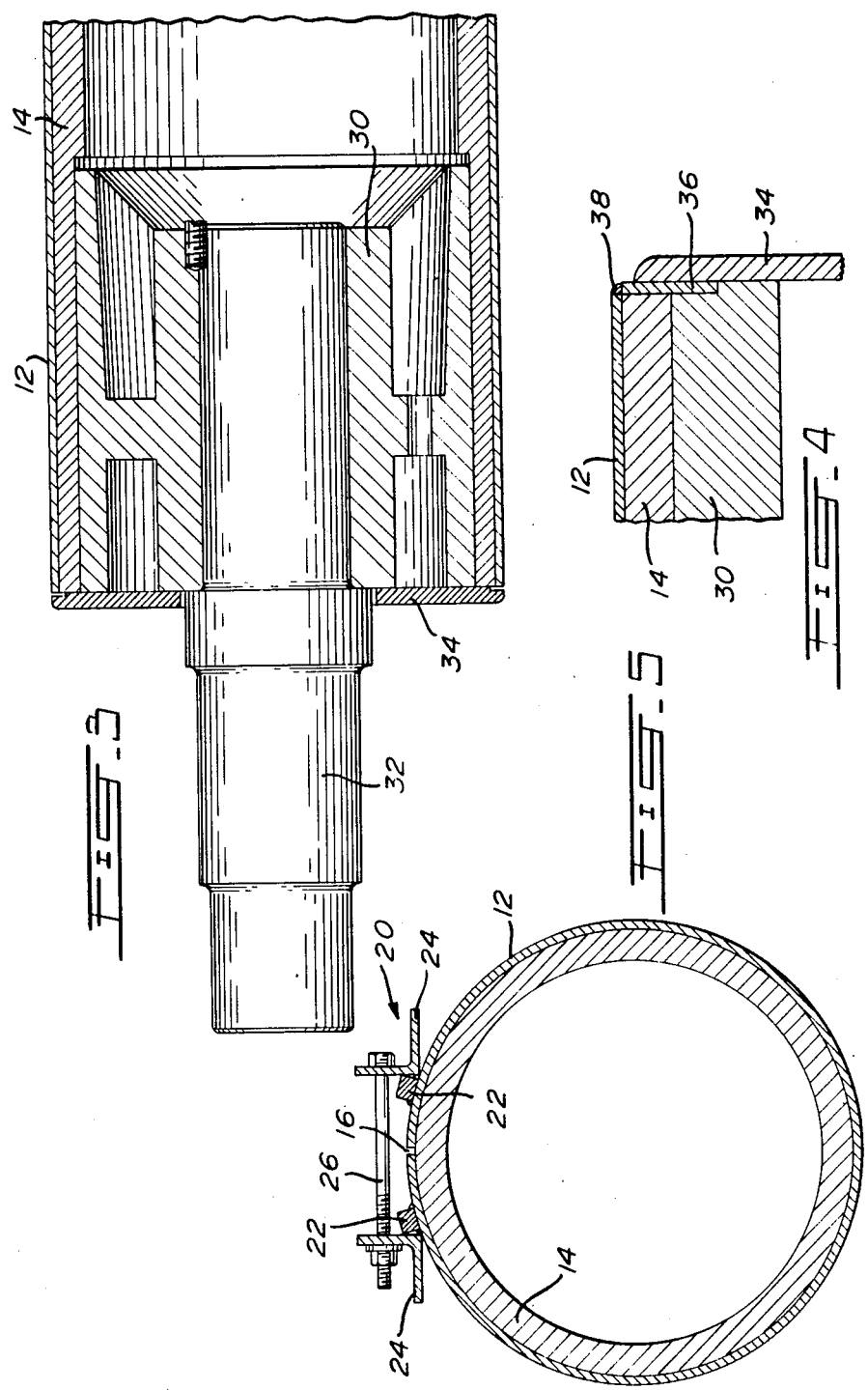

4,760,232

METHOD OF CLADDING A STEEL CYLINDRICAL CORE

FIELD AND BACKGROUND OF THE INVENTION

The present invention relates to cladding a steel cylindrical core such as a roll with a metal sheet such as a stainless steel sheet.

Felt rolls are used in paper mills. They are generally used to support the various felt runs in the press and dryer sections of a paper machine. In the past, when a rubber cover has been applied to a steel felt roll, however, the rubber cover wears and so has limited life. It has been found that a stainless steel clad roll provides a longer life than a rubber covered roll, and the stainless steel clad roll is comparable or less in cost than a conventional steel rubber covered felt roll.

By applying a cladding of stainless steel or other non-corrosive steel sheet about a steel cylindrical core, one can utilize the advantages of having a durable corrosion resistant outer surface without having to make the whole roll out of stainless steel. Attempts have been made in the past to apply a non-corrosive steel sheet to a steel core. One problem with the majority of these cladding methods is that the cladding is attached to the core and thus if the two materials have a different coefficient of expansion, then when the roll heats up, distortion may occur in the cladding, alternatively, the cladding may split or part from the core. Furthermore if the cladding is loosely attached to the core, it may in service slide horizontally and cause many problems.

SUMMARY OF THE INVENTION

The present invention aims to overcome some of the problems encountered with cladding a steel cylindrical core by ensuring that the cladding is tightly fitted to the core and circumferentially welded to the core at only one end, thus providing freedom for the stainless steel to expand and contract.

The present invention provides a process for cladding a steel cylindrical core with a metal sheet, comprising the steps of: preparing at least two shells of metal sheets, each shell having a length equivalent to the circumference of the core plus a predetermined extra, wrapping the shells about the cylindrical core, side by side, leaving a predetermined circumferential gap between the shells, with a longitudinal joint on one shell being staggered at a different circumferential location on the core to a longitudinal joint for the other shell, heating the shells and clamping the shells together around the core until the longitudinal joints each attain a predetermined longitudinal gap, welding the longitudinal gaps, and circumferential gap between the shells, while the shells are hot, ensuring the sheets are welded together and not welded to the core.

In other embodiments the metal sheets are preferably stainless steel and the cylindrical core is carbon steel. One shell is attached to the cylindrical core at one end of the core, preferably by welding. In another embodiment, stainless steel end caps are provided at both ends of the cylindrical core, and in a still further embodiment, the process forms a felt roll having a diameter in the range of about 6 to 20 inches. The felt roll is ground and polished after cladding.

BRIEF DESCRIPTION OF THE DRAWINGS

FIG. 1 is an isometric view showing one embodiment of a cladding on a cylindrical core;

FIG. 2 is a partial longitudinal view of the cylindrical core shown in FIG. 1;

FIG. 3 is a partial sectional longitudinal view of one end of the cylindrical core shown in FIG. 1;

FIG. 4 is a partial sectional longitudinal view of the other end of the cylindrical core to that shown in FIG. 3;

FIG. 5 is an axial cross sectional view through a cylindrical core showing the clamping of the shell to the core.

DESCRIPTION OF THE PREFERRED EMBODIMENT

To further explain the present invention, the core of a felt roll, which is preferably from seamless steel pipe or welded steel pipe, is to be clad with a stainless steel sheet. A length of pipe forming the core is first placed on a lathe and held at both tail and drive ends by internal chucks. The pipe is then bored at both ends concentrically. Finished machined roll heads are then pressed into the ends of the pipe. The assembly is then reinstalled on the lathe, and the roll heads bored concentrically at both ends to suit the journals. The finished journals are then fitted in the roll heads. The roll assembly is again installed on the lathe supported on the journals. The surface of the pipe is machined in preparation for receiving the stainless steel cladding. In carrying out the machining of the pipe, the final wall thickness must be maintained to suit the working conditions of the roll with no consideration given to what strength the stainless steel cladding may add to it.

FIG. 1 illustrates a clad roll 10 with two shells 12 wrapped around the core. FIG. 2 illustrates the core 14 with the shell 12 thereon.

Once the core has been machined on the outside, the finished outside diameter of the core is used to determine the circumference of the cladding shell. This process can be applied to felt rolls ranging in diameter from about 6 to 20 inches. The stainless steel cladding material commences as a flat stainless steel sheet 14 gauge (0.070 ins.) thickness. The developed length of the circumference is determined from the formula (core diameter X 3.1416 +0.150 inches). This formula produces a longitudinal gap 16 of approximately 0.90 inches when the sheet is wrapped around the roll. As can be seen in FIG. 1, the stainless steel cladding 12 is made in two shells and wrapped side by side around the core 14 so that the longitudinal joints 16 are staggered approximately 180 degrees apart. In one embodiment, they are 180 degrees apart about the circumference of the core. However, this is only preferred. It is important that they are not in line. The circumferential gap 18 between the two shells 12 is also kept at approximately 0.090 inches.

The two shells 12 are then wrapped around the cylindrical core with the longitudinal seams 16 approximately 180 degrees apart. A clamping arrangement is attached to each shell 12 as described hereafter. The shells 12 are then heated to approximately 300 degrees F. and the expansion gained by the heating is taken up by the clamping arrangement. The final longitudinal gap 16 is approximately 0.080 inches which is sufficient to join the ends of the shell 12 together without weld metal touching the carbon steel core. The longitudinal gap 16 is then tack welded while the shell is at approximately 300 degrees F. The tack welding occurs on the longitudinal gaps 16 and the circumferential gap 18. The tack welds are approximately 2 inches apart and Tungsten Inert Gas (T.I.G.) welding preferably used which is suitable for stainless steel sheets. Both shells 12 are applied according to this procedure. When the second shell is installed, the 0.080 inch gap is maintained for the circumferential gap 18. The end of one shell 12 is continuously circumferentially welded to one end of the roll. This permits the stainless steel shell to expand and contact freely.

FIG. 5 illustrates a suitable clamp 20 for clamping the shell 12 to the core 14 during heating. Rectangular bars 22 are tack welded adjacent the ends of the shell for the longitudinal joint 16. Two angles 24 with a series of holes having bolts 26 holding the angles 24 together are then inserted over the bars 22 and the bolts 26 tightened as the shell 12 is heated until the longitudinal gap 16 is approximately 0.080 inches. After tack welding, the clamp 20 is removed and the bars 22 are removed. A continuous weld of the T.I.G. type is then placed along the circumferential gap 18 and the longitudinal gap 16.

FIGS 3 and 4 illustrate roll heads 30 at each end of the core 14 shrunk fit into place in the core. Each roll head 30 has a journal 32 pressed into the roll head 30.

In FIGS. 3 and 4, stainless steel end caps 34 are shown at each end of the core 14. FIG. 4 illustrates a facing ring 36, which is made of stainless steel, and is rigidly attached to the core 14 and clamped to the roll heads 30 by the end cap 34. The stainless steel shell 12 is welded at weld 38 to the facing ring 36. At the other end, as shown in FIG. 3, there is no weld between the shell 12 and the end collar 36. Thus the shell 12 is able to move independently of the core 14 as it is only welded to the core at one end.

The stainless steel cladding and welds are then endless belt ground and polished to the required uniform finish. The roll is then dimensionally inspected and the exact diameter recorded on standard clad roll inspection forms.

Various changes may be made to the process defined herewith without departing from the scope of the present invention which is limited only by the following claims.

The embodiments of the invention in which an exclusive property or privilege is claimed are defined as follows.

1. A process for cladding a steel cylindrical core with a metal sheet, comprising the steps of:
preparing at least two shells of metal sheet, each shell having a length equivalent to the circumference of the core plus approximately 0.15 inches;
wrapping the shells about the cylindrical core, side by side, leaving a predetermined circumferential gap between the shells, with a longitudinal joint on one shell being staggered at a different circumferential location on the core to a longitudinal joint for the other shell;
heating and clamping the shells tightly around the core until the longitudinal joints each attain a predetermined longitudinal gap;
welding the longitudinal gaps, and circumferential gap between the shells, while the shells are hot, ensuring the sheets are welded together and not welded to the core.

2. The process for cladding according to claim 1 wherein the metal sheet is stainless steel and the cylindrical core is carbon steel.

3. The process for cladding according to claim 2 wherein the stainless steel sheet is about 0.070 inches thick, the predetermined circumferential gap and the predetermined longitudinal gaps are each about 0.08 inches.

4. The process for cladding according to claim 3 wherein the shells are heated to about 300 degrees F.

5. The process for cladding according to claim 1 wherein the metal sheet is stainless steel and the cylindrical core is carbon steel, and wherein the process forms a felt roll having a diameter in the range of about 6 to 20 inches.

6. The process for cladding according to claim 2 wherein a longitudinal bar is tack welded to each end of each of the shells adjacent the longitudinal joint, and including clamp means to clamp the two longitudinal bars together until the ends of each of the the shells reach the predetermined longitudinal gap.

7. The process for cladding according to claim 1 wherein the longitudinal gaps and circumferential gap between the shells are first tack welded together and then continuously welded.

8. The process for cladding according to claim 7 wherein the metal sheet is stainless steel and the tack welding and the continuous welding is carried out by the T.I.G method.

9. The process for cladding according to claim 2 wherein one shell is attached to the cylindrical core at one end of the core.

10. The process for cladding according to claim 9 wherein stainless steel end caps are provided rigidly held at both ends of the cylindrical core and the shell is welded to one of the stainless steel end caps.

11. The process for cladding according to claim 5 wherein the felt roll is ground and polished after cladding.

* * * * *